May 14, 1968     R. L. ABBOTT     3,382,736
EPICYCLIC CHANGE-SPEED GEARING
Filed July 27, 1966
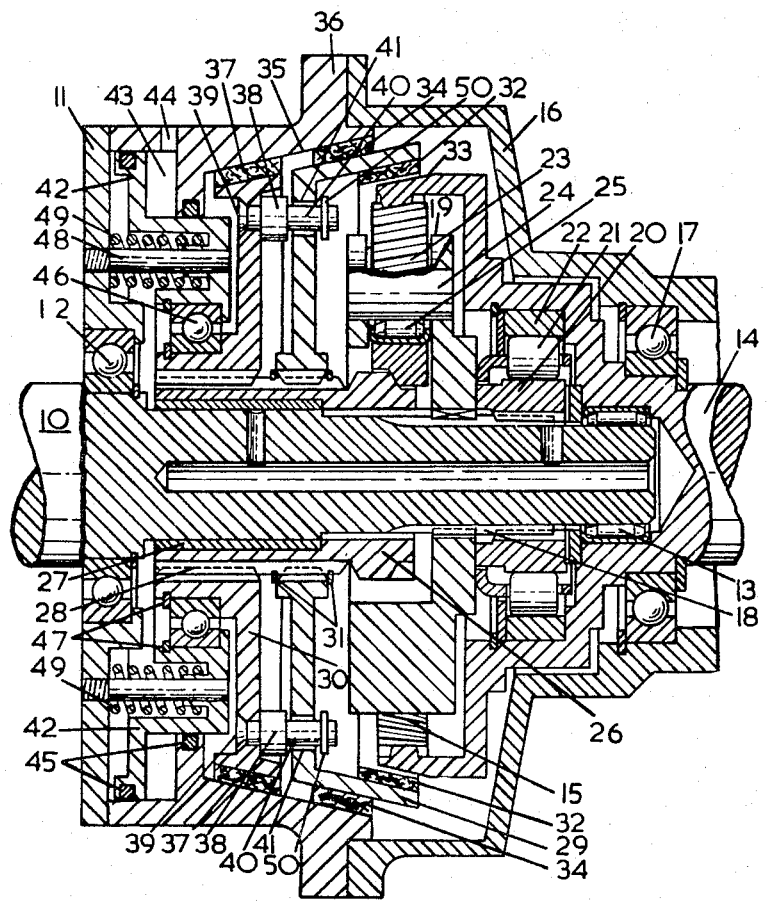
INVENTOR:-
RANDLE LESLIE ABBOTT United States Patent Office
3,382,736
Patented May 14, 1968

3,382,736
EPICYCLIC CHANGE-SPEED GEARING
Randle Leslie Abbott, Leamington Spa, England, assignor, by mesne assignments, to Auto Transmissions Limited, London, England, a British company
Filed July 27, 1966, Ser. No. 568,290
Claims priority, application Great Britain, Aug. 24, 1965, 36,423/65
14 Claims. (Cl. 74—740)

ABSTRACT OF THE DISCLOSURE

A two speed planetary gear set which may be used in series with a main change speed transmission the gear set being provided with a helical torque responsive connection to the reaction gear which is effective to vary both brake surface area and pressure when in one ratio and vary clutch pressure in response to reverse torque conditions in the other ratio.

The invention relates to an epicyclic change-speed gearing of the kind having a reaction element rotatively fast with a friction engaging member that is axially-movable between a first position in which it engages a frusto-conical brake surface to hold the reaction element against rotation thereby providing a planetary ratio of the gearing, and a second position in which it engages a frusto-conical clutch surface rotatively fast with another element of the gearing to provide unit ratio.

An epicyclic change-speed gearing of the kind specified is well-known in the art and is frequently used as an auxiliary two-speed gearing for an automobile power transmission system. As is well-known in the art such an auxiliary gearing may be arranged either so that the planetary ratio constitutes a multiplication or overdrive ratio, or alternatively so that the planetary ratio constitutes a reduction or underdrive ratio. Although the invention can be applied with some advantage to an underdrive auxiliary gearing it is particularly useful when applied to an overdrive auxiliary gearing of the kind in which a unidirectional clutch is utilised to prevent the power input shaft from rotating faster than the power output shaft. With an overdrive auxiliary gearing of this type, unit ratio is transmitted through the unidirectional clutch provided that the drive is from the power input shaft to the power output shaft—that is a forward torque condition. However, when the power output shaft tends to drive the power input shaft, that is a reverse torque condition, the unidirectional clutch will tend to freewheel and unit ratio will be transmitted through the engagement of the friction engaging member with the frusto-conical clutch surface. On the other hand, whenever the planetary overdrive ratio is engaged, the torque reaction on the reaction element is transmitted by the friction engaging member to the frusto-conical brake surface irrespective of the direction in which the torque is transmitted.

An overdrive auxiliary gearing of the kind that has just been discussed can be arranged in several positions in an automotive power transmission system, the most usual positions being between the main change-speed gearing and the final drive unit. When an auxiliary overdrive gearing is arranged in any of these latter positions, it must be capable of transmitting a large range of torque up to a maximum value of full engine torque multiplied by the largest reduction ratio of the main change-speed gearing. Usually the controls for an auxiliary overdrive gearing are arranged so that the overdrive ratio cannot be engaged unless the top ratio of the main change-speed gearing is engaged. Under these circumstances unit ratio of the auxiliary overdrive gearing will be engaged for all forward torque conditions exceeding the full engine torque and the torque will be transmitted through the unidirectional clutch which has a very high torque capacity. However during reverse torque conditions, for instance when a reverse ratio of the main change-speed gearing is engaged or the vehicle is tending to drive the engine, the torque will be transmitted through the engagement of the friction engaging member with the frusto-conical clutch surface. On the other hand the maximum torque reaction that is applied by the friction engaging member to the frusto-conical brake surface occurs when the engine is producing full torque.

With such an auxiliary overdrive gearing the friction engaging member is usually biased to engage the coacting frusto-conical clutch surface by a series of compression coil springs or by a diaphragm spring, and is movable against the action of the spring or springs whenever a force producing device, such as a fluid pressure operated piston and cylinder assembly, is actuated. It has been found that if the springs are sufficiently strong to cater for the maximum reverse torque to be transmitted from the frusto-conical clutch surface to the friction engaging member, the gear-change from overdrive to unit ratio in the auxiliary overdrive gearing whilst the vehicle is driving the engine can produce an undesirable shock in the transmission. In order to increase the force of engagement of the friction engaging member with the frusto-conical clutch surface during reverse torque conditions and to increase the force of engagement of the friction engaging member with its frusto-conical brake surface during forward drive conditions it has been proposed in British patent specifications Nos. 739,126, 759,019 and 952,371 that helically-inclined torque-transmitting surfaces be used to produce an augmenting end thrust. The helically-inclined surfaces may be provided by helical gear teeth in the epicyclic gear train, by helical splines between the reaction element and the friction engaging member, or by equivalent helically-inclined surfaces. This method of producing an augmenting end thrust is most attractive as the end thrust increases as the torque transmitted increases, and the direction of the end thrust will be reversed whenever the direction of the transmitted torque reverses.

However we have found that an increase of axial load applied to a frusto-conical friction surface will not, after a certain limit has been reached, result in a proportionate increase in the torque capacity. Thus, apart from increasing the force of engagement, it is often necessary to increase the area of friction material if a greater torque capacity is required. From a theoretical point of view the area of a frusto-conical friction surface can be increased by enlarging either the axial or the radial dimensions. Unfortunately there are problems associated with such alterations as an increase of the radial dimension will enlarge the overall diameter of the gearing and associated casing, and an increase of the axial dimension above a certain limit is ineffectual from a practical point of view due to the difficulty in getting the complete surface of the friction material to engage the corresponding friction surface.

The problem of providing a frusto-conical brake in an epicyclic change-speed gearing of the kind specified with an adequate torque capacity without increasing the overall diameter of the gear casing can therefore be alleviated only to a limited extent by the use of helically-inclined torque-transmitting surfaces as has hitherto been proposed. An object of this invention is to improve still further the torque capacity of a frusto-conical brake in an epicyclic change-speed gearing without incurring the penalty of an increased overall diameter of the gear casing.

According to the invention an epicyclic change-speed gearing has a reaction member which is rotatively fast with a friction engaging member and a brake member, the friction engaging member is axially-movable between a first position in which it engages a first frusto-conical brake surface to hold the reaction element against rotation thereby providing a planetary ratio of the gearing and a second position in which it engages a frusto-conical clutch surface rotatively fast with another element of the gearing to provide unit ratio, the brake member is axially-movable between a first position in which it engages a second frusto-conical brake surface to hold the reaction element aginst rotation and second position in which it is disengaged from said second frusto-conical brake surface, the brake member is axially-movable relatively to the friction engaging member, a first abutment means is provided operatively between the brake member and the friction engaging member to prevent the brake member from being in its said first position when the friction engaging member is in its said second position, a second abutment means is arranged operatively between the brake member and the friction engaging member to allow the brake member when in its said second position to apply an axial load to increase the force of engagement of the friction engaging member with its frusto-conical clutch surface, a spring means is arranged to bias one of said two members to one of its said first or second positions, a force producing device is actuable to move the said one member against the bias of said spring means to the other of its said first or second positions, helically-inclined surfaces are adapted to transmit at least a portion of the torque transmitted by the gearing and to produce an axial thrust commensurate to the value and direction of the torque transmitted, and the helically-inclined surfaces are arranged to apply the axial thrust to the other of said two members.

In the case where the planetary ratio constitutes an overdrive ratio, a unidirectional clutch may, according to a further feature, be arranged to prevent a power input shaft to the gearing from rotating in a forward direction faster than a power output shaft from the gearing, and the hand of the helically-inclined surfaces is arranged such that the axial thrust will urge the said other member towards its said first position when there is a forward torque condition, for instance the transmission of torque from the power input shaft to drive the power output shaft in the forward direction, and will urge the said other member towards its said second position when there is a reverse torque condition, for instance the transmission of torque from the power input shaft to drive the power output shaft in the reverse direction.

According to a further feature the spring means may be arranged to bias the said one member towards its second position and the force producing device is actuable to move the said one member against the bias of said spring means to its first position.

According to another feature the helically-inclined surfaces may be arranged to apply the axial thrust to the friction engaging member, and the spring means and the force producing device are operatively connected to the brake member.

According to a further feature either of the said two members may carry a series of axially-directed studs that extend through corresponding apertures in the remaining member, and the first and second abutment means are carried by these studs. Preferably the first frusto-conical brake surface and the second frusto-conical brake surface are axially-spaced portions of a single frusto-conical surface.

According to another feature the reaction element may be a helically-toothed sun gear wheel of the epicyclic gearing that is allowed limited axial freedom of movement and is held axially fast with the said other member. In such a case the sun wheel is preferably provided with a single series of straight toothed splines which coact with corresponding splines of both the brake member and the friction engaging member. Alternatively the reaction element may, according to a further feature, be inhibited from axial movement and is provided with a series of helical splines which mesh with corresponding helical splines of the said other member thereby constituting said helically-inclined surfaces.

The application of the invention to an auxiliary overdrive gearing is now described, by way of example only, with reference to the accompanying drawing which is a horizontal axial section.

In the drawing a power input shaft 10 is supported from an end plate 11 by a combined journal and thrust bearing 12, and is also supported by a roller bearing 13 from a power output shaft 14 which is formed integral with a helically-toothed annulus gear wheel 15 and is supported from a casing 16 by a combined journal and thrust bearing 17. Adjacent the roller bearing 13 the power input shaft 10 is provided with axially-directed splines 18 which drive through corresponding splines the planet carrier 19 and the inner race 20 of a unidirectional clutch 21 of which the outer race 22 is rotatively fast with the power output shaft 14 so that the unidirectional clutch 21 serves to prevent the power input shaft 10 from being driven faster than the power output shaft 14.

Three helically-toothed planet gear wheels 23, only one of which is shown, are supported by pins 24 and roller bearings 25 from the planet carrier 19 and mesh both with the annulus gear wheel 15 and with a helically-toothed sun gear wheel 26. The latter is journalled on the power input shaft 10 by means of a bush 27 and is allowed limited axial movement in both directions for a reason that will become apparent later on.

The sun gear wheel 26 is formed with axially-directed splines 28 which are drivingly engaged with corresponding splines of a friction engaging member 29 and a brake member 30. The friction engaging member 29 is held axially fast with the sun gear wheel 26 by two spring clips 31 and is provided with a frusto-conical clutch pad 32 for engaging a corresponding frusto-conical clutch surface 33 formed on the annulus gear wheel 15, and with a frusto-conical brake pad 34 for engaging a corresponding frusto-conical brake surface 35 formed on a casing member 36 which is held axially and rotatively fast with the end plate 11 and the casing 16 by a series of unshown bolts. The brake member 30 on the other hand is provided with a single frusto-conical brake pad 37 for engaging the brake surface 35, and has a series of axially-directed studs 38 each of which is secured to the brake member by a riveted head 39 and has a reduced diameter portion 40 extending with clearance through an aperture 41 in the friction engaging member 29.

The casing member 36 supports an axially-sliding piston 42 which defines with the casing member 36 an annular cylinder 43 having an inlet port 44 for receiving oil under pressure and oil seals 45 to inhibit leakage. The piston 42 is held axially fast with the brake member 30 by a combined journal and thrust bearing 46 and associated spring clips 47, and is prevented from rotating by a series of axially-directed studs 48 which are supported by the end plate 11 and are a close sliding fit in corresponding bores formed in the piston 42. A series of compression coil springs 49 are arranged one around each of the studs 48 to react between the piston 42 and the end plate 11 thereby biasing the piston 42 and the brake member 30 towards the right from the position shown in the drawing.

The condition of the gearing shown in the drawing is that oil under pressure is applied through the inlet port 44 to the cylinder 43 so that the brake member 30 is urged to the left against the bias of the springs 49 for the frusto-conical brake pad 37 to engage the brake surface 35 thereby holding the sun gear wheel 26 against rotation and providing the planetary overdrive ratio of the gearing. When the brake member 30 is in this position a series of spring clips 50, secured one to the reduced diameter portion 40 of each stud 38, limit the movement of the friction engaging member 29 to the right so that the frusto-conical clutch pad 32 cannot engage the clutch surface 33. The hand of the helical gear teeth of the sun gear wheel 26 is arranged such that an axial end thrust directed towards the left of the drawing is produced whilst the power input shaft 10 is driving the power output shaft 14 in the forward direction, that is a forward torque condition. Whilst the planetary overdrive ratio is engaged and there is a forward torque condition, this end thrust will cause the friction engaging member 29 to move to the left so that the frusto-conical brake pad 34 will also engage the brake surface 35. Thus the sun gear wheel 26 is held against rotation by a substantially constant torque reaction due to the engagement of the frusto-conical brake pad 37 with brake surface 35, and also by a varying torque reaction due to the engagement of the frusto-conical brake pad 34 with brake surface 35. This latter torque reaction will increase as the torque transmitted increases whereby the total torque reaction holding the sun gear wheel 26 against rotation will at all times be sufficient for the torque transmitted by the gearing.

The fluid circuit supplying oil under pressure to the cylinder 43 is arranged such that the fluid acting in cylinder 43 will automatically be exhausted whenever a gear ratio other than the top gear ratio of the main change-speed gearing driving the power input shaft 10 is engaged. Due to this arrangement the planetary overdrive ratio cannot be engaged when a reverse drive ratio of the main change-speed gearing is operative and the only reverse torque condition to which the overdrive ratio is subjected occurs during overrun conditions, that is, when the power output shaft 14 tends to drive the power input shaft 10 in the forward direction. Under these conditions the direction of the end thrust generated by the sun gear wheel 26 is reversed so that the friction engaging member 29 is moved to the right from the position shown in the drawing to disengage the frusto-conical brake pad 34 from the brake surface 35. As previously mentioned the spring clips 50 prevent the friction engaging member 24 from moving sufficiently to the right for the frusto-conical clutch pad 32 to engage the clutch surface 33, and accordingly the end thrust to the right generated by the helical teeth of the sun gear wheel 26 is applied to the brake member 30 through the studs 38 to reduce the net load applied by the piston 42 to engage the frusto-conical brake pad 37 with brake surface 35. This reduction of the torque reaction holding the sun gear wheel 26 against rotation during overrun conditions does not allow the frusto-conical brake pad 37 to slip relatively to the brake surface 35 as the maximum engine braking torque applied to the power input shaft 10 during an overrun condition whilst the top gear ratio of the main change-speed gearing is engaged is only a fraction of the maximum driving torque that the engine can develop, and the angle of the helical teeth of the sun gear wheel 26 is arranged such that the maximum end thrust that can be applied to the friction engaging member 29 during overrun conditions whilst the top gear ratio of the main change-speed gearing is engaged is insufficient to reduce the net loading on the frusto-conical brake pad 37 to a value at which any slip could occur.

When the oil under pressure in cylinder 43 is exhausted for any reason, the springs 49 will urge the piston 42 and the brake member 30 to the right in the drawing thereby disengaging the frusto-conical brake pad 37 from brake surface 35. As the brake member 30 moves to the right the shoulders formed at the roots of the reduced diameter portions 40 of the studs 38 will engage the friction engaging member 29 and will ensure that the frusto-conical brake pad 34 is also disengaged from the brake surface 35. As soon as both of the frusto-conical brake pads 34 and 37 are disengaged from the brake surface 35, the gearing will be in a neutral condition and the power input shaft 10 will accelerate under no-load conditions until it has accelerated to the same speed as the power output shaft 14 when the unidirectional clutch 21 will lock so that unit ratio is engaged. In the meantime the springs 49 acting through the piston 42, the bearing 45, the brake member 30, and the aforesaid shoulders defined at the roots of the reduced diameter portions 40 of the studs 38, will move the friction engaging member 29 to the right in the drawing until the frusto-conical clutch pad 32 is engaged with the clutch surface 33. Whilst the power input shaft 10 is driving the power output shaft 14 in the forward direction, the engagement of the frusto-conical clutch pad 32 with the clutch surface 33 plays no essential part in the operation of the gearing as the torque path is directly through the unidirectional clutch and accordingly it will be appreciated that no torque will be transmitted by the gear wheels 15, 23 and 26 and no end load will be developed by the sun gear wheel 26.

Whilst unit ratio is engaged a reverse torque condition can occur either when a reverse ratio of the main change-speed gearing is engaged so that the power input shaft 10 is driven in the reverse direction and must drive the power output shaft in the same direction, or when the power output shaft 14 drives the power input shaft 10 during an overrun condition in the forward direction. Under both of these conditions the unidirectional clutch 21 becomes ineffective as it freewheels and the torque must be transmitted by the engagement of the frusto-conical clutch pad 32 with clutch surface 33. However a reverse torque condition also reverses the direction of the end thrust developed by the sun gear wheel 26 so that it is directed to the right in the drawing to augment the force of the springs 49 for engaging the frusto-conical clutch pad 32 with clutch surface 33. The magnitude of the end thrust developed by the sun wheel increases as the torque transmitted increases and it will therefore be seen that the torque capacity of the frusto-conical clutch pad 32 and the clutch surface 33 will be increased as the torque transmitted is increased so that it will at all times be sufficient.

If desired the sun gear wheel 26 can be restrained from axial movement and the connection between the sun gear wheel 26 and the friction engaging member 29 may be through helical splines—in this event the spring clips 31 would not be required. Although helical splines in this position would be effective, slight relative rotational movement would take place between the friction engaging member 29 and the brake member 30 and accordingly the apertures 41 would have to be in the form of arcuate slots. Also, if desired, the piston 42 and the springs 49 may be arranged to act on the friction engaging member 29 and the helical end thrust may be applied to the brake member 30.

Although the invention has been described with reference to a particular type and arrangement of epicyclic gearing, it should be noted that it can also be applied with some advantage to other types and arrangements of epicyclic gearing.

What I claim as my invention and desire to secure by Letters Patent of the United States is:

1. An epicyclic change-speed gearing including a friction engaging member, a brake member, a reaction element for said epicyclic change-speed gearing rotatively fast with the friction engaging member and the brake member, means defining first and second frusto-conical brake surfaces, another element for said epicyclic change-speed gearing defining a frusto-conical clutch surface, said friction engaging member being axially-movable between a first position in which it engages said first frusto-conical brake surface to hold the reaction element against rotation thereby providing a planetary ratio of the epicyclic change-speed gearing and a second position in which it engages said frusto-conical clutch surface to provide unit ratio of the epicyclic change-speed gearing, said brake member being axially-movable between a first position in which it engages the second frusto-conical brake surface to hold the reaction element against rotation and a second position in which it is disengaged from the second frusto-conical brake surface, the brake member is axially-movable relatively to the friction engaging member, a first abutment means arranged operatively between the brake member and the friction engaging member to prevent the brake member from being in its said first position when the friction engaging member is in its said second position, a second abutment means arranged operatively between the brake member and the friction engaging member to allow the brake member when in its said second position to apply an axial load to increase the force of engagement of the friction engaging member with the frusto-conical clutch surface, a spring means arranged to bias one of said two members to one of its said first or second positions, a force producing device actuatable to move the said one member against the bias of the spring means to the other of its said first or second positions, means defining helically-inclined surfaces, said helically-inclined surfaces being arranged to transmit at least a portion of the torque transmitted by the epicyclic change-speed gearing and to produce an axial thrust commensurate to the value and direction of the torque transmitted, and the helically-inclined surfaces being arranged to apply the axial thrust to the other of the said two members.

2. An epicyclic change-speed gearing, as in claim 1, in which said spring means is arranged to bias the said one member towards its said second position, and the force producing device is actuable to move the said one member against the bias of said spring means to its first position.

3. An epicyclic change-speed gearing, as in claim 1, in which the helically-inclined surfaces are arranged to apply the axial thrust to the friction engaging member, and the spring means and the force producing means are operatively connected to the brake member.

4. An epicyclic change-speed gearing, as in claim 1, in which a series of axially-directed studs is carried by any one of said two members, the remaining one of said two members defines a corresponding series of apertures through which the axially-directed studs extend, and the said first and second abutments are carried by the said studs.

5. An epicyclic change-speed gearing, as in claim 1, in which said first and second frusto-conical brake surfaces are axially-spaced portions of a single frusto-conical surface.

6. An epicyclic change-speed gearing, as in claim 1, which includes a helically-toothed sun gear wheel that is allowed limited axial freedom of movement and is held axially fast with the said other member, and the helically-toothed sun gear wheel constitutes the reaction element.

7. An epicyclic change-speed gearing, as in claim 6, in which a single series of straight toothed splines are fast with the sun gear wheel, a first corresponding series of splines are fast with the brake member and coact with the said single series of straight toothed splines, and a second corresponding series of splines are fast with the friction engaging member and also coact with the said single series of straight toothed splines.

8. An epicyclic change-speed gearing, as in claim 1, including a power input shaft to the epicyclic change-speed gearing, a power output shaft from the epicyclic change-speed gearing, said planetary ratio is arranged such that the power input shaft is arranged to drive the power output shaft in a forward direction at an overdrive ratio, a unidirectional clutch is arranged to prevent the power input shaft from rotating in the forward direction faster than the power output shaft, and the hand of said helically-inclined surfaces is arranged such that the said axial thrust will urge the said other member towards its said first position when there is a forward torque condition, for instance the transmission of torque from the power input shaft to drive the power output shaft in said forward direction, and said axial thrust will urge the said other member towards its said second position when there is a reverse torque condition, for instance the transmission of torque from the power input shaft to drive the power output shaft in the reverse direction.

9. An epicyclic change-speed gearing, as in claim 8, in which said spring means is arranged to bias the said one member towards its said second position, and the force producing device is actuable to move the said one member against the bias of said spring means to its first position.

10. An epicyclic change-speed gearing, as in claim 9, in which the helically-inclined surfaces are arranged to apply the axial thrust to the friction engaging member, and the spring means and the force producing means are operatively connected to the brake member.

11. An epicyclic change-speed gearing, as in claim 10, in which a series of axially-directed studs is carried by any one of said two members, the remaining one of said two members defines a corresponding series of apertures through which the axially-directed studs extend, and the said first and second abutments are carried by the said studs.

12. An epicyclic change-speed gearing, as in claim 11, in which said first and second frusto-conical brake surfaces are axially-spaced portions of a single frusto-conical surface.

13. An epicyclic change-speed gearing, as in claim 12, which includes a helically-toothed sun gear wheel that is allowed limited axial freedom of movement and is held axially fast with the said other member, and the helically-toothed sun gear wheel constitutes the reaction element.

14. An epicyclic change-speed gearing, as in claim 13, in which a single series of straight toothed splines are fast with the sun gear wheel, a first corresponding series of splines are fast with the brake member and coact with the said single series of straight toothed splines, and a second corresponding series of splines are fast with the friction engaging member and also coact with the said single series of straight toothed splines.

References Cited

UNITED STATES PATENTS

| | | | |
|---|---|---|---|
| 2,578,308 | 12/1951 | Iavelli | 74—781 |
| 2,635,480 | 4/1953 | Maurer et al. | 74—781 X |
| 2,654,269 | 10/1953 | Wilson | 74—781 X |
| 3,182,528 | 5/1965 | Lamburn | 74—740 |
| 3,251,247 | 5/1966 | Lamburn | 74—781 X |

DONLEY J. STOCKING, *Primary Examiner.*

THOMAS C. PERRY, *Examiner.*